United States Patent [19]  [11] 3,946,816
van der Lely et al.  [45] Mar. 30, 1976

[54] ROTARY HARROWS
[76] Inventors: Ary van der Lely, 10 Weverskade, Maasland; Cornelis Johannes Gerardus Bom, 36 Esdoornlaan, Rozenburg, both of Netherlands
[22] Filed: Nov. 4, 1974
[21] Appl. No.: 520,809

Related U.S. Application Data
[63] Continuation of Ser. No. 338,606, March 6, 1973, abandoned.

[30] Foreign Application Priority Data
Mar. 8, 1972 Netherlands.................. 7203041

[52] U.S. Cl. ................................ 172/65; 172/59
[51] Int. Cl.² .................... A01B 9/00; A01B 33/06
[58] Field of Search ........ 172/59, 63, 65, 101, 102, 172/111, 152

[56] References Cited
UNITED STATES PATENTS
1,170,459 2/1916 Pierce ................................. 172/59
2,031,188 2/1936 Storey et al. ................... 172/63 X
3,667,551 6/1972 Lely et al. ......................... 172/59

FOREIGN PATENTS OR APPLICATIONS
479,538 6/1929 Germany .......................... 172/59

Primary Examiner—Edgar S. Burr
Assistant Examiner—Paul T. Sewell
Attorney, Agent, or Firm—Mason, Mason & Albright

[57] ABSTRACT
A harrow has rotary soil-working members in driving connection and spaced apart from one another to work non overlapping paths through the soil being cultivated. Between the rotary soil-working members, non rotary tines are positioned to work the strips remaining between the paths already worked. The non rotary tines are pivoted to the frame to move to and fro through the strips during travel. The rotary soil-working members are tined supports and the supports are elongated horizontal members to which arcuate-shaped brackets are attached. The brackets afford stops for the non rotary tines that are moving to and fro during operation so that the to and fro movements of the non rotary tines are limited.

26 Claims, 4 Drawing Figures

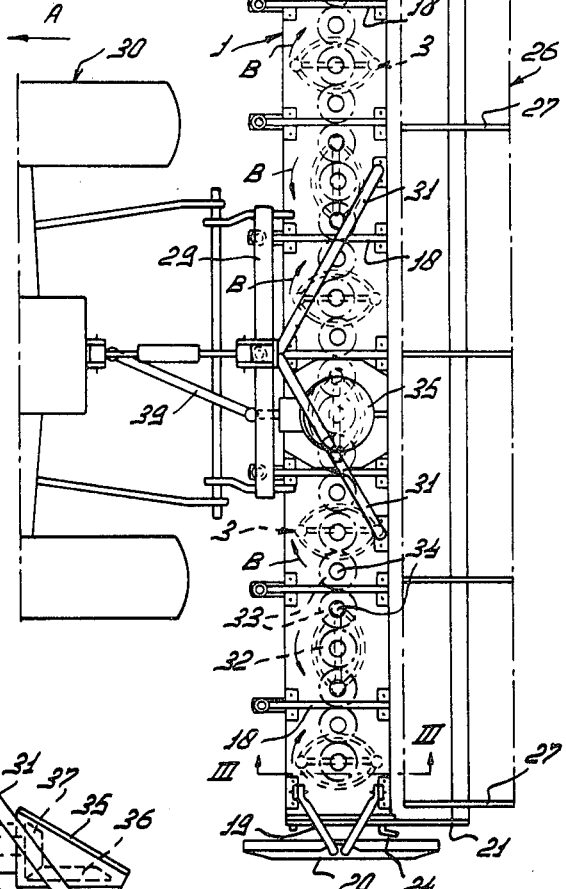
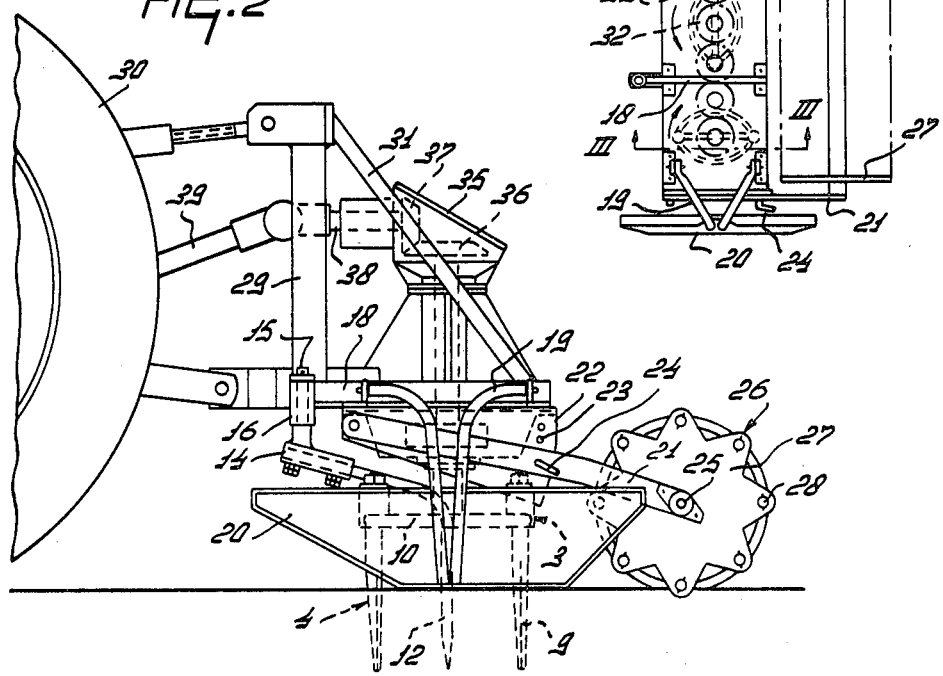

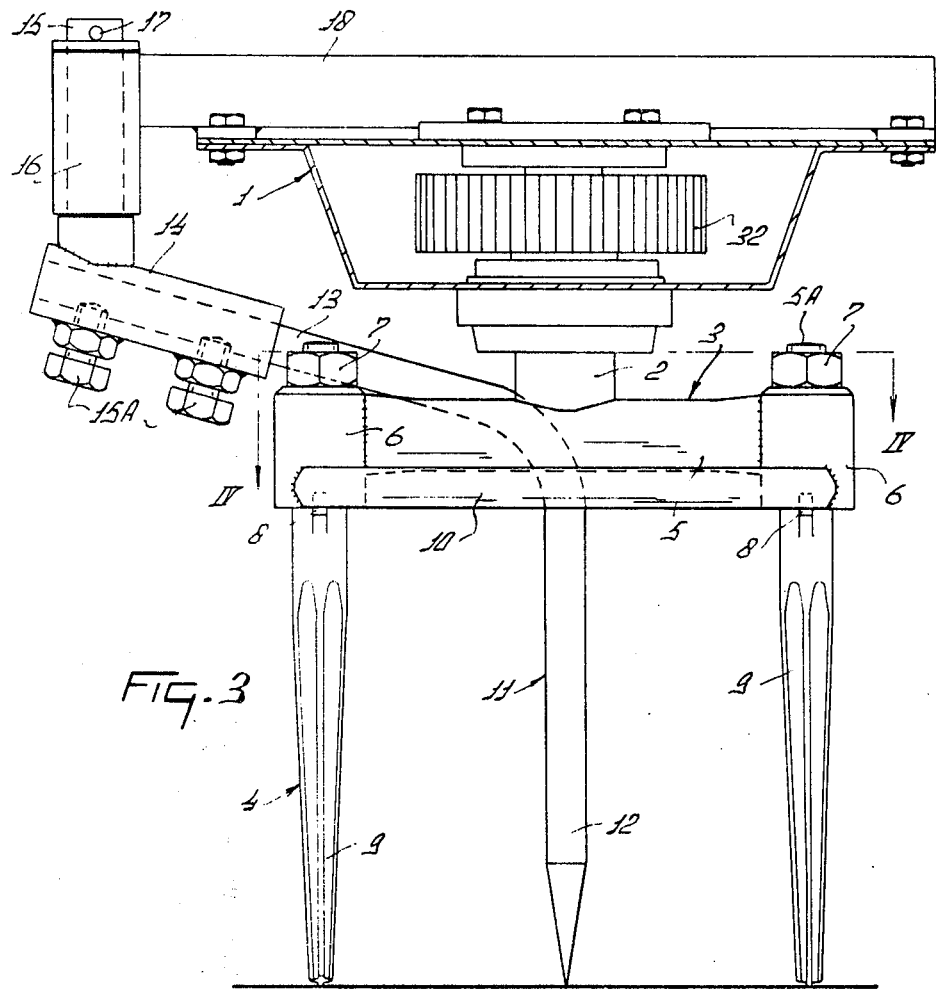
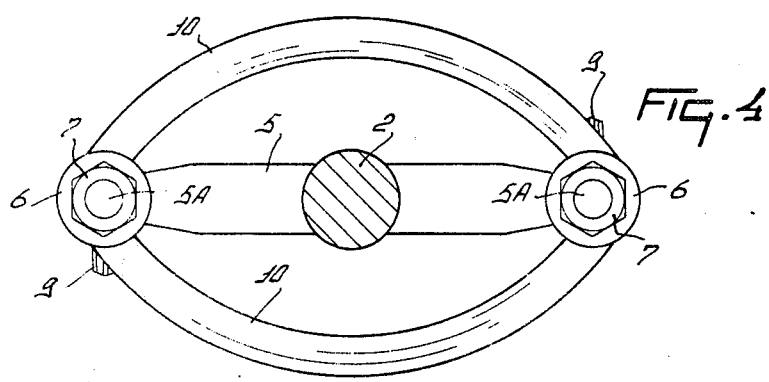

ROTARY HARROWS

This is a continuation of application Ser. No. 338,606 filed Mar. 6, 1973, now abandoned.

According to the invention, there is provided a rotary harrow of the kind set forth, wherein at least one further soil working member is arranged between at least two of the rotatable soil working members or rotors, the or each further soil working member being arranged so that it can move to and fro relative to a frame portion of the harrow during the use of the latter.

For a better understanding of the invention, and to show how the same may be carried into effect, reference will now be made, by way of example, to the accompanying drawings, in which;

FIG. 1 is a plan view of a rotary harrow in accordance with the invention connected to the rear of an agricultural tractor, FIG. 2 is a side elevation, to an enlarged scale, corresponding to FIG. 1, FIG. 3 is a section, to an enlarged scale, taken on the line III—III of FIG. 1, and FIG. 4 is a section taken on the line IV—IV of FIG. 3.

Referring to the drawings, the rotary harrow which is illustrated has a hollow frame portion 1 that extends substantially horizontally perpendicular to the intended direction of operative travel of the harrow which is from right to left as seen in FIGS. 1 and 2 of the drawings. The hollow frame portion 1 accommodates parts of upwardly extending, and preferably substantially vertical, shafts 2 whose lower downwardly projecting ends have corresponding soil working members or rotors 3 rigidly secured to them. In the embodiment which is being described, there are eight soil working members or rotors 3 arranged side-by-side in a single row that extends parallel to the transverse length of the frame portion 1, the axes of rotation (afforded by the shafts 2) of neighbouring soil working members or rotors 3 being spaced apart from one another by distances of substantially 40 centimeters.

Each soil working member or rotor 3 comprises a substantially horizontally extending tine support 5 that is rigidly secured to the lowermost downwardly projecting end of the corresponding shaft 2 so as to extend radially therefrom in two relatively opposite directions. The free ends of the tine support 5 carry substantially vertically disposed sleeve-like tine holders 6 each of which receives the upper fastening portion 5A of a corresponding rigid tine 4. The fastening portions 5A are of circular cross-section and their upper ends are screw-threaded to receive corresponding retaining nuts 7. The fastening portions 5A are also provided, towards their lower ends, with two lugs 8 that project radially therefrom at diametrically opposite sides thereof to co-operate with recesses formed in the lower ends of the holders 6 to prevent the tines 4 from turning about the longitudinal axes of their fastening portions 5A in the holders 6.

Each tine 4 also includes a lower soil working portion 9 whose upper end makes an integral angular junction with the corresponding fastening portion 5A. An angle of substantially 8° is preferably enclosed between the longitudinal axes of the fastening portion 5A and soil working portion 9 of each tine 4 and it will be noted that the lugs 8 co-operate with the recesses in the tine holder 6 in such a way that the soil working portions 9 normally trail with respect to the intended direction of rotation of the corresponding soil working member or rotor 3. This arrangement can be seen best in FIG. 4 of the drawings where the soil working member or rotor 3 that is illustrated in that Figure is intended to rotate in a clockwise direction. However, it should also be noted that it is possible to loosen the nuts 7, turn the fastening portions 5A through 180° in their holders 6 and re-tighten the nuts 7 whereupon the lugs 8 and the recesses in which they are entered will co-operate with the nuts 7 in retaining the tines 4 in positions in which their soil working portions 9 lead with respect to the intended directions of rotation of the soil working members or rotors 3. There are operating conditions under which such an arrange-ment of the tines 4 is prefabrable to the normal trailing disposition thereof.

The soil working portions 9 of the tines 4 have a generally rectangular or other angular cross-section and taper downwardly towards their tips, the flat sides of the angular cross-section being formed with concave grooves that extend downwardly to the lowermost free ends or tips of the portions 9. Each soil working member or rotor 3 is provided with a stop in the form of two substantially arcuately curved brackets 10 that are disposed symmetrically at opposite sides of the corresponding tine support 5 with their opposite ends welded or otherwise rigidly secured to opposite sides of lower regions of the corresponding two tine holders 6. During the operation of the harrow, the brackets 10 co-operate with further soil working members in the form of rigid tines 11. Each tine 11 comprises a substantially vertical soil working portion 12 formed with a point at its lower end, the upper end of said portion 12 merging by way of an integral bend disposed at substantially the same level as the tine supports 5 into a fastening portion 13 which is inclined upwardly and forwardly with respect to the intended direction of operative travel of the harrow. The two portions 12 and 13 are of substantially equal lengths and the magnitude of the bend by which they are interconnected is such that an angle of substantially 120° is enclosed between their longitudinal axes. Each tine 11 is of substantially circular cross-section throughout its length and the upper leading end of each fastening portion 13 thereof is received in a corresponding sleeve-like holder 14 in which it is releasably retained by a pair of locking bolts 15A. Each holder 14 is rigidly secured to the lowermost end of a corresponding substantially vertical shaft 15 that is turnably journalled in a corresponding bush 16 mounted at the leading end of a corresponding support 18 fastened to the top of the frame portion 1. The shafts 15 project above the upper ends of the bushes 16 and their projecting portions are provided with washers and transverse pins 17 that releasably retain the shafts 15 in the bushes 16. In the embodiment which is being described, there are seven supports 18 that all extend parallel, in plan view (FIG. 1), to the intended direction of operative travel of the harrow, said supports 18 being located, in plan view, midway between the shafts 2 that correspond to two neighbouring soil working members or rotors 3.

Two plates 20 that are normally substantially vertically disposed are provided immediately beyond the opposite ends of the single row of soil working members or rotors 3, said plates 20 being connected by pairs of arms 19 to pivotal mountings on top of the frame portion 1 adjacent the opposite lateral ends thereof. The pivotal mountings define substantially horizontal axes that extend substantially parallel to the intended direction of operative travel of the harrow and allow the plates 20 to turn upwardly and downwardly to some extend to match any undulations in the surface of the ground over which their lowermost edges slide during operative travel of the harrow. When the harrow is undergoing inoperative transport, the plates 20 and their arms 19 can be tilted upwardly through substantially 180° about their pivotal mountings to bring the plates to inverted inoperative positions in which they are disposed on top of the frame portion 1. Substantially vertical and generally sector-shaped plates 22 are fastened to the opposite lateral ends of the frame portion 1 and are provided at the front with respect to the intended direction of operative travel of the harrow with stub shafts defining a substantially horizontal axis that is perpendicular to the direction which has just been mentioned. Arms 21 that extend rearwardly from the stub shafts are turnable upwardly and downwardly about those stub shafts alongside the plates 22. The plates 22 have curved rear edges alongside which arcuately curved rows of holes 23 are formed, each hole 23 being at the same distance from the axis defined by the stub shafts at the leading ends of the plates 22. The arms 21 carry horizontal locking pins 24 at the same distances from the stub shafts as the holes 23 and the tip of each locking pin 24 can be entered in any chosen one of the corresponding row of holes 23 to retain that arm in a corresponding angular setting about the axis defined by the stub shafts at the leading ends of the plates 22.

The rearmost ends of the two arms 21 carry horizontal bearings 25 which receive stub shafts at the opposite ends of a rotary soil compression member in the form of a roller 26. The roller 26 comprises a plurality, such as five, of vertical support plates 27 that are regularly spaced apart from one another along the axial length of the roller and whose peripheries are formed with holes to receive a plurality, such as eight, of elongated tubular elements 28 that are entered loosely through said holes and that are wound helically around the longitudinal axis of the roller. The front of the frame portion 1 with respect to the intended direction of operative travel of the harrow is provided with a generally triangular coupling member 29 arranged for connection, in the generally known manner which is shown in FIGS. 1 and 2 of the drawings, to the three-point lifting device or hitch at the rear of an agricultural tractor 30 or other operating vehicle. The connection of the coupling member 29 to the frame portion 1 is strengthened by two tie bars 31 that extend between the apex of the coupling member and anchorages at the top and rear of the frame portion 1, said tie bars 31 diverging rearwardly from the coupling member 29 as seen in plan view (FIG. 1).

Each of the shafts 2 is provided inside the hollow frame portion 1 with a corresponding spur- or straight-toothed pinion 32 that preferably, but not essentially, has 17 teeth. Two substantially vertical shafts 34 are provided inside the hollow frame portion 1 between each pair of shafts 2 and these shafts 34 each have corresponding straightor spur-toothed pinions 33 mounted on them in a freely rotatable manner. Each pinion 33 preferably, but not essentially, has 18 teeth and the pinions 33 cooperate with the pinions 32 in such a way that the perpendicular distance between the axes of rotation defined by each pair of neighbouring shafts 2 has the aforementioned magnitude of substantially 40 centimeters. One of the centre pair of soil working members or rotors 3 has its supporting shaft 2 extended upwardly beyond the top of the hollow frame portion 1 into a gear box 35 that is mounted on said frame portion. The upward extension of said shaft 2 is provided, inside the gear box 35, with a bevel pinion 36 and the teeth of said bevel pinion 36 are in driven mesh with those of a smaller bevel pinion 37 that is disposed inside the gear box 35 at the rear end of a rotary input shaft 38 of the harrow whose leading end projects substantially horizontally forward from the gear box 35 in a direction parallel to the intended direction of operative travel of the harrow. The forwardly projecting leading end of the rotary input shaft 38 is splined or otherwise keyed in such a way as to enable it to be placed in driven connection with the power take-off shaft of the aforementioned agricultural tractor 30 or other operating vehicle through the intermediary of a telescopic transmission shaft 39 of known construction that is provided with universal joints at its opposite ends.

In the use of the rotary harrow which has been described, its coupling member 29 is connected to the three-point lifting device or hitch of the agricultural tractor 30 or some other suitable operating vehicle and the rotary input shaft 38 of the gear box 35 is placed in driven connection with the power take-off shaft of the same tractor 30 or other vehicle by way of the telescopic transmission shaft 39. The harrow is moved over a field from right to left as seen in FIGS. 1 and 2 of the drawings with each soil working member or rotor 3 revolving in the opposite direction to its neighbour or to both of its neighbours. It will be seen from FIG. 1 of the drawings that the tine supports 5 of the eight soil working members or rotors 3 are so arranged that, when one of them extends substantially parallel to the intended direction of operative travel, the support 5 that corresponds to the or each neighbouring soil working member or rotor 3 in the single row extends substantially perpendicular to said direction. This substantially perpendicular disposition of the tine supports 5 of neighbouring soil working members or rotors 3 is, of course, maintained during the rotation of the soil working members or rotors.

With the construction which has been described, each of the eight soil working members or rotors 3 cultivates a strip of land that is spaced a short distance from the or each of the neighbouring strips. However, the narrow intermediate strips of land are worked by the tines 11 which tines can oscillate or otherwise turn to and fro about the axes afforded by the corresponding co-operating shafts 15 and bushes 16 relative to the frame portion 1. When one of the tines 11 strikes an obstacle, such as a stone, a piece of wood, root or the like, it can deflect laterally of the direction of travel about the corresponding foregoing axis afforded by the parts 15 and 16 but cannot become hooked behind one of the rotor tines 4 because the rotating brackets 10 will displace it laterally before such hooking engagement can occur. A possible cause of serious damage is thus positively avoided. When one of the tines 11 is laterally deflected with respect to the direction of travel of the harrow, the stops that are afforded by the brackets 10 of the soil working members or rotors 3 at opposite sides thereof successively contact that tine and positively turn the tine about the axis afforded by the corresponding shaft 15 and bush 16. This arrangement ensures that the tines 11 are rapidly returned to their normal operating positions in which their soil working portions are contained in substantially vertical planes that also contain the axes afforded by the shafts 15 and bushes 16 and that are parallel to the intended direction of operative travel of the harrow. The brackets 10 also serve as protective screens against stones and the like which might otherwise make damaging contact with the tine supports 5 and tine holder 6 when the tines 11 are laterally deflected.

In the harrow which has been described, neighbouring soil working members or rotors 3 work strips of ground that are laterally spaced apart from one another by short distances, the narrow strips of ground corresponding to these short distances being worked by the rigid tines 11 that are capable of moving to and fro in directions transverse to the direction of operative travel of the harrow. A single broad strip of soil is thus cultivated while allowing passage between the tines 4 and 11 of any stones, pieces of wood, roots or other like obstacles. The harrow is thus particularly suitable for use on stoney land.

Although not illustrated in the accompanying drawings, it is possible to provide a construction in which oscillatory to and fro movement of the further soil working members afforded by the rigid tines 11 is brought about solely by a positive mechanical drive thereto. The arms 21, sector plates 22 and locking pins 24 afford means for setting the level of the axis of rotation of the roller 26 relative to the remainder of the harrow and it will be apparent from FIG. 2 of the drawings that the particular holes 23 in the sector plates 22 that are chosen to co-operate with the locking pins 24 primarily determine the depth of penetration of the tines 4 and 11 into the soil that is to be worked by the harrow. The upwardly and downwardly movable plates 20 that are located at the opposite ends of the single row of the soil working members or rotors 3 and furhter soil working members that are afforded by the tines 11 slide over the ground surface during the use of the harrow when they occupy the operative positions thereof that are illustrated in FIGS. 1 and 2 of the drawings and serve both substantially to prevent the formation of soil ridges at the margins of the broad strip of ground that is worked by the harrow and to guard against stones and other heavy objects being flung laterally of the harrow by the rapidly rotating tines 4. Any lumps of soil that are displaced by the tines 4 and/or 11, but that are not broken up thereby, tend to be crushed and broken by the elongated tubular elements 28 of the following roller 26.

While various features of the rotary harrow that has been described and/or illustrated in the accompanying drawings will be set forth in the following claims as inventive features, it is emphasised that the invention is not necessarily limited to those features and that it includes within its scope all of the parts of the rotary harrow that have been described and/or illustrated both individually and in various combinations.

What we claim is:

1. A rotary harrow comprising a movable frame and a plurality of rotary soil-working members mounted on upwardly extending shafts supports on said frame, driving means for rotating said soil-working members, said shafts and soil-working members being positioned side by side in a row that extends transverse to the direction of travel, said soil-working members being substantially spaced from one another to work paths and leave a strip between adjacent paths in the soil, non rotary further soil-working members positioned between adjacent rotary soil-working members, said non rotary members being pivotally connected to the front of said frame and extending downwardly to the rear to work the strips between the worked paths, said non rotary members being movable to and fro through the strips.

2. A harrow as claimed in claim 1, wherein deflection means is positioned to deflect each further soil-working member during operation of said harrow.

3. A harrow as claimed in claim 2, wherein said deflection means is positioned to bear directly against said further member in its extreme to and fro movements to limit the lateral movements of the further soil-working member.

4. A harrow as claimed in claim 3, wherein said deflection means are arcuate brackets connected to each end of substantially horizontal tine supports of said rotary soil working members.

5. A rotary harrow comprising a movable frame and a plurality of rotary soil-working members mounted on upwardly extending shafts supported on said frame, driving means for rotating said soil-working members, said soil-working members being positioned side by side in a row that extends transverse to the direction of travel, said soil-working members being substantially spaced from one another to work paths and leave a strip between adjacent paths in the soil, further non rotary soil-working members connected to said frame on pivot connections, said non rotary soil-working members being positioned between adjacent rotary soil-working members and each of said non rotary members comprising a straight soil-working portion that extends downwardly to work the strips between the worked paths, each non rotary member being located adjacent corresponding deflection means connected to at least one adjacent rotary member, said soil-working portions of said non rotary members being turned by said deflection means during the operation of said rotary members and moved through the strips to work same.

6. A harrow as claimed in claim 5, wherein the pivot connections of the further soil-working members comprise substantially vertical shafts journalled to said frame.

7. A harrow as claimed in claim 6, wherein each substantially vertical shaft is located in front of its corresponding further soil-working member.

8. A harrow as claimed in claim 7, wherein each substantially vertical shaft is journalled in a sleeve of a support which is secured to a portion of said frame.

9. A harrow as claimed in claim 8, wherein the supports are all secured to a common portion of said harrow.

10. A harrow as claimed in claim 5, wherein said deflection means comprises stops interconnected to at least two rotary soil-working members and the latter are located at opposite sides of said further soil-working member.

11. A harrow as claimed in claim 10, wherein each of said rotary soil-working members comprises substantially horizontal tine supports and said stops are brackets connected to the supports, said brackets being mounted to perform movements that allow them to come successively into contact with said further soil-working member positioned between them.

12. A harrow as claimed in claim 11, wherein said tine supports are elongated and said stops are fixed to ends of the tine supports.

13. A harrow as claimed in claim 12, wherein said tine supports extend substantially perpendicular to the upwardly extending shafts and said stops extend at least partly along the lengths of said tine supports.

14. A harrow as claimed in claim 13, wherein said stops are located at opposite sides of the tine supports.

15. A harrow as claimed in claim 14, wherein said stops extend along the entire lengths of the tine supports.

16. A harrow as claimed in claim 10, wherein said stops are arcuate brackets connected to each end of said tine supports.

17. A harrow as claimed in claim 16, wherein each further soil-working member is comprised of a tine.

18. A harrow as claimed in claim 17, wherein each tine includes a substantially vertically extending soil-working portion the upper end of which is connected to a fastening portion and the latter portion extends upwardly and forwardly to its pivot connection with said frame.

19. A harrow as claimed in claim 18, wherein the longitudinal axes of said fastening portion and said soil-working portion of the further soil-working member enclose an angle of substantially 120° between them.

20. A harrow as claimed in claim 18, wherein the tine is of substantially circular cross-section.

21. A harrow as claimed in claim 5, wherein the driving means includes toothed pinions on said upwardly extending shafts and said toothed pinions are in connection with at least one similarly toothed drive-transmitting pinion between each toothed pinion.

22. A harrow as claimed in claim 21, wherein two drive-transmitting pinions are arranged between adjacent toothed pinions.

23. A harrow as claimed in claim 22, wherein each drive-transmitting pinion is freely rotatable about the axis of a corresponding shaft that is substantially parallel to the upwardly extending shafts of the rotary soil-working members.

24. A harrow as claimed in claim 23, wherein each drive-transmitting pinion has a number of teeth which is one less than the number of teeth on the toothed pinions.

25. A harrow as claimed in claim 5, wherein there are eight rotatable soil-working members positioned in a single row.

26. A harrow as claimed in claim 5, wherein the shafts of adjacent rotary soil-working members are spaced apart from one another by perpendicular distances of substantially 40 centimeters.

* * * * *